United States Patent
Mori et al.

(10) Patent No.: US 8,998,397 B2
(45) Date of Patent: Apr. 7, 2015

(54) INK, INK CARTRIDGE AND INK JET RECORDING METHOD

(75) Inventors: Yasuhito Mori, Kawasaki (JP); Tomohiro Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 13/530,504

(22) Filed: Jun. 22, 2012

(65) Prior Publication Data
US 2013/0027476 A1    Jan. 31, 2013

(30) Foreign Application Priority Data
Jul. 27, 2011  (JP) .................................. 2011-164371

(51) Int. Cl.
*B41J 2/01*    (2006.01)
*C09D 11/38*    (2014.01)
*B41J 2/21*    (2006.01)
*C09D 11/322*    (2014.01)

(52) U.S. Cl.
CPC .............. *C09D 11/38* (2013.01); *B41J 2/2107* (2013.01); *C09D 11/322* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ........... 347/100, 95, 96, 101, 102, 88, 99, 21, 347/20, 9; 106/31.6, 31.13; 523/160, 161
See application file for complete search history.

(56) References Cited

U.S. PATENT DOCUMENTS

| | | | |
|---|---|---|---|
| 5,766,325 A * | 6/1998 | Gundlach et al. ............. | 347/100 |
| 6,193,792 B1 * | 2/2001 | Fague ......................... | 106/31.65 |
| 6,683,121 B2 | 1/2004 | Chiou et al. | |
| 7,160,372 B2 | 1/2007 | Yoshizawa et al. | |
| 7,226,498 B2 | 6/2007 | Yamashita et al. | |
| 7,247,194 B2 | 7/2007 | Okamura et al. | |
| 7,270,701 B2 | 9/2007 | Jinnou et al. | |
| 7,297,197 B2 | 11/2007 | Jinnou et al. | |
| 7,550,037 B2 | 6/2009 | Mafune et al. | |
| 7,611,571 B2 | 11/2009 | Yamashita et al. | |
| 8,075,126 B2 | 12/2011 | Yoshizawa et al. | |
| 8,556,405 B2 | 10/2013 | Habashi et al. | |
| 2002/0099129 A1 | 7/2002 | Chiou et al. | |
| 2006/0196389 A1 * | 9/2006 | Tsuji et al. ..................... | 347/100 |
| 2009/0239044 A1 | 9/2009 | Habashi et al. | |
| 2009/0258145 A1 * | 10/2009 | Mukae et al. .................... | 347/85 |
| 2010/0075046 A1 * | 3/2010 | Hakamada et al. ........... | 427/256 |
| 2011/0141190 A1 | 6/2011 | Moribe et al. | |

FOREIGN PATENT DOCUMENTS

| | | | | |
|---|---|---|---|---|
| CN | 1356360 | A | 7/2002 | |
| CN | 101248146 | A | 8/2008 | |
| CN | 101675128 | A | 3/2010 | |
| JP | 2006-199744 | A | 8/2006 | |
| JP | 2006-225638 | A | 8/2006 | |
| JP | 2006199744 | A * | 8/2006 | ................. B41J 2/01 |

OTHER PUBLICATIONS

Chinese Office Action dated Mar. 3, 2014, issued in counterpart Chinese Application No. 2012102654010, and English-language translation thereof.

* cited by examiner

*Primary Examiner* — Manish S Shah

(74) *Attorney, Agent, or Firm* — Fitzpatrick, Cella, Harper & Scinto

(57) ABSTRACT

The invention provides an ink that inhibits lowering of ejection stability caused by a precipitate derived from a self-dispersible type monoazo pigment and also inhibits deterioration of a liquid contact surface of a heater portion of a recording head. The ink is an ink for ink jet recording system employing an thermal energy, containing a monoazo pigment, a resin and a surfactant represented by the following formula (1). A proportion of a molecular weight of an ethylene oxide group moiety occupying the surfactant is 10% or more and 85% or less, the monoazo pigment is a self-dispersible pigment to the particle surface of which at least one hydrophilic group selected from the group consisting of —COOM, —SO$_3$M, —PO$_3$HM and —PO$_3$M$_2$ is bonded directly or through another atomic group, and the acid value of the resin is 240 mg KOH/g or less.

Formula (1)

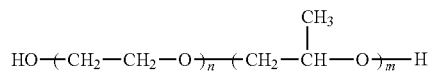

17 Claims, No Drawings

INK, INK CARTRIDGE AND INK JET RECORDING METHOD

BACKGROUND OF THE INVENTION

1. Field of the Invention

The present invention relates to an ink for ink jet, and an ink cartridge and an ink jet recording method using the ink.

2. Description of the Related Art

According to an ink jet recording method, recording can be made on various recording media. Various inks such as, for example, an ink suitable for recording an image of photograph-like image quality on glossy paper and an ink suitable for recording documents on plain paper have been proposed according to purposes thereof for recording a better image. In recent years, the ink jet recording method has been utilized even in recording of business documents including characters and graphic charts using plain paper as a recording medium, and the frequency of use in such use applications markedly increases. Therefore, the use of pigments as coloring materials for not only a black ink but also color inks as inks suitable for recording characters and graphic charts on a recording medium such as plain paper increases.

Under such circumstances, various investigations on a monoazo pigment among pigments used in inks for ink jet are advanced because the pigment is excellent in coloring ability and advantageous even from the viewpoint of cost. However, the monoazo pigment is generally weak against heat, so that the following problem is caused when the monoazo pigment is applied to an ink jet system in which an ink is ejected from a recording head by the action of thermal energy. For example, it is known that when C.I. Pigment Yellow 74 that is a representative monoazo pigment is used, a precipitate of the pigment adheres to and deposits in the interior of an ink flow path of a recording head to lower ejection properties. In particular, in recent years, there has been an increasing demand for more improving the number of pages recordable and lowering a running cost. There has thus been a strong demand for inhibiting the lowering of ejection properties at a level higher than before.

In order to solve such a problem, the following proposals have been made. It has been proposed to inhibit lowering of ejection stability and storage stability of an ink by containing a substance capable of inhibiting aggregation of a monoazo pigment dispersed by a resin dispersant in the ink and improve the color developability of the resulting image (see Japanese Patent Application Laid-Open No. 2006-225638). In addition, there has been proposed an ink containing a monoazo pigment of a self-dispersible type in which a hydrophilic group has been bonded to the surface of a pigment particle, a water-soluble organic compound and a substance for inhibiting aggregation of the monoazo pigment (see Japanese Patent Application Laid-Open No. 2006-199744). This ink is said to inhibit lowering of ejection stability and storage stability even in an ink jet system utilizing thermal energy and enable improving the color developability of the resulting image.

SUMMARY OF THE INVENTION

However, when the inks described in Japanese Patent Application Laid-Open No. 2006-225638 and Japanese Patent Application Laid-Open No. 2006-199744 are applied to the ink jet recording system in which an ink is ejected from a recording head by the action of thermal energy to perform a long-term ink ejection operation, blur may occur in the resulting image in some cases by a precipitate derived from the monoazo pigment. This blur of the image does not occur when a durability test of a level required of a conventional ink jet recording apparatus is performed. However, it has been found that when it is intended for an ink jet recording apparatus to satisfy high durability, which has been required in recent years, the blur of the image occurs due to the lowering of the ejection stability. As described above, in recent years, there has been an increasing demand for more improving the number of pages recordable and lowering a running cost. Therefore, it is intended to lengthen the life of a recording head, and it is also required for even an ink to satisfy ejection properties higher than before.

Accordingly, it is an object of the present invention to provide an ink that can solve the following problem caused in an ink containing a self-dispersible type monoazo pigment when the ink is ejected from a recording head of an ink jet system by the action of thermal energy. That is, the object of the present invention is to provide an ink that inhibits lowering of ejection stability by a precipitate derived from a self-dispersible type monoazo pigment and also inhibits deterioration of a liquid contact surface of a heater portion of a recording head. Another object of the present invention is to provide an ink cartridge and an ink jet recording method that can stably record an image high in color developability.

The above objects can be achieved by the present invention described below. That is, the ink according to the present invention is an ink containing a monoazo pigment, a resin and a surfactant represented by the following formula (1) for use in an ink jet recording system in which an ink is ejected from a recording head by an action of thermal energy, wherein a proportion of a molecular weight of an ethylene oxide group moiety occupying the surfactant is 10% or more and 85% or less, the monoazo pigment is a self-dispersible pigment to the particle surface of which at least one hydrophilic group selected from the group consisting of —COOM, —SO₃M, —PO₃HM and —PO₃M₂ (M in the formula is a hydrogen atom, alkali metal, ammonium or organic ammonium) is bonded directly or through another atomic group, and the acid value of the resin is 240 mg KOH/g or less.

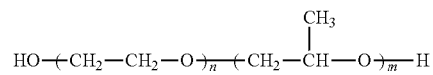

Formula (1)

wherein n is 1.0 or more, and m is 1.0 or more.

According to the present invention, there is also provided an ink cartridge comprising an ink and an ink storage portion storing the ink, wherein the ink is the ink described above.

According to the present invention, there is further provided an ink jet recording method comprising ejecting an ink from a recording head of an ink jet system by the action of thermal energy to record an image on a recording medium, wherein the ink is the ink described above.

According to the ink of the present invention, lowering of ejection stability by a precipitate derived from the self-dispersible type monoazo pigment can be inhibited, and deterioration of a liquid contact surface of a heater portion of a recording head can also be inhibited. In addition, according to the ink cartridge and ink jet recording method of the present invention, an image high in color developability can be stably recorded.

Further features of the present invention will become apparent from the following description of exemplary embodiments.

DESCRIPTION OF THE EMBODIMENTS

Preferred embodiments of the present invention will now be described in detail. Incidentally, various physical properties such as a surface tension in the present invention are all values at 25° C.

In order to record an image high in color developability on a recording medium such as plain paper, it is advantageous to use, as a coloring material of an ink, such a self-dispersible type monoazo pigment as described in Japanese Patent Application Laid-Open No. 2006-199744, not such a resin-dispersible type as described in Japanese Patent Application Laid-Open No. 2006-225638. Thus, the present inventors have considered the cause that the conventional ink containing the self-dispersible type monoazo pigment does not satisfy the ejection properties of the level required in recent years. In the ink jet recording system utilizing thermal energy, the quantity of energy applied to a heater of a recording head for ejecting an ink is not always constant, but has some latitude. In detail, there are cases that energy more than the quantity of energy necessary for ejection of ink is applied to the ink and that energy less than the necessary quantity is applied. Since the monoazo pigment is low in heat stability, such a phenomenon as described below occurs when a great quantity of thermal energy is applied to the ink. That is, the pigment decomposed by excess thermal energy recrystallizes, thereby forming a precipitate low in dispersibility. This precipitate adheres to the interior of an ink flow path of a recording head and the neighborhood of an ejection orifice, whereby an ink droplet comes not to be normally ejected. As a result, it is considered that the ink cannot be applied to a desired position to cause blur in the resulting image.

In the conventional ink containing such a resin-dispersible type monoazo pigment as described in Japanese Patent Application Laid-Open No. 2006-225638, a substance capable of inhibiting the recrystallization of the decomposed pigment, such as a specific water-soluble organic solvent or a nonionic surfactant, has been added in advance, thereby coping with the occurrence of the precipitate. However, the mere addition of such a substance to the ink has been substantially unable to inhibit the occurrence of the precipitate. In addition, such an ink is considered to have been at such a level that the occurrence frequency of the precipitate is small, and so the lowering of ejection stability does not occur because the time period of ejection is relatively short, and the number of times of applying a great quantity of thermal energy is small.

On the other hand, when such ejection for a long period of time as required at present has been assumed, it has been found that the number of times of applying excess thermal energy to a heater also markedly increases as the number of times of ejection increases, and consequently the occurrence of the precipitate cannot be inhibited according to the methods described in Japanese Patent Application Laid-Open No. 2006-225638 and Japanese Patent Application Laid-Open No. 2006-199744 to cause the lowering of ejection stability.

In addition, according to the ink described in Japanese Patent Application Laid-Open No. 2006-199744, a liquid contact surface of a heater portion may have been deteriorated by ejection of the ink for a long period of time, thereby causing ejection failure in some cases. The heater portion after the ink described in Japanese Patent Application Laid-Open No. 2006-199744 has been ejected for a long period of time has been observed. As a result, a precipitate (kogation) has been scarcely observed on the liquid contact surface of the heater portion, and deterioration of the liquid contact surface of the heater portion caused by conducting ejection for a long period of time has been observed. When the ink described in Japanese Patent Application Laid-Open No. 2006-199744 is used, it is inferred that the precipitate does not deposit on the liquid contact surface of the heater portion, but the liquid contact surface of the heater portion is deteriorated by repeating the long-term ejection, and consequently a wire for applying a voltage to a heater is broken. As a result, it is considered that ejection failure occurs to affect the resulting image.

As described above, the problem that the ejection stability is lowered by the precipitate formed by the thermal decomposition and recrystallization of the monoazo pigment when such long-term ejection as required in recent years is performed cannot be solved according to the prior art. Likewise, the deterioration of the liquid contact surface of the heater portion by the long-term ejection cannot be inhibited according to the prior art.

As a result of an investigation by the present inventors, it has been found that in order to solve the above-described two problems at the same time, it is important to select a resin having a specific acid value and a surfactant having a specific structure as components contained in an ink together with the self-dispersible type monoazo pigment. Specifically, a resin whose acid value is 240 mg KOH/g or less and a surfactant represented by a formula (1) which will be described subsequently are used in the present invention. With respect to the above-described two problems, phenomena caused in the respective problems will hereinafter be described in connection with the self-dispersible type monoazo pigment, resin and surfactant that are components of the ink. Incidentally, these components may be abbreviated as "monoazo pigment", "resin" and "surfactant", respectively.

Regarding Lowering of Ejection Stability by Precipitate:

The present inventors infer the mechanism with which the ink according to the present invention inhibits the formation of the precipitate by thermal decomposition and recrystallization of the pigment as follows.

(A) Case of Ink Containing Monoazo Pigment and Resin:

As described above, the number of times of applying excess thermal energy increases when long-term ejection is performed. For example, when excess thermal energy is applied to an ink (hereinafter also referred to as "Ink A") containing a monoazo pigment and a resin (containing no surfactant represented by the formula (1)), the present inventors infer that the following phenomenon occurs.

The pigment and the resin adsorb each other by hydrophobic interaction between a hydrophobic portion on the surface of a pigment particle and a hydrophobic unit of the resin, and a hydrophilic unit of the resin retains its affinity for water, whereby the dispersed state thereof is stably held. However, when excess thermal energy is applied to the ink over a long period of time, the resin easily desorbs from the pigment. At the portion on the particle surface of the pigment where the resin has desorbed, the hydrophobic portion comes to be exposed, so that the dispersion stability of the pigment is lowered. In addition, the thermal energy acts directly on the portion of the pigment where the resin has desorbed. Thus, such a phenomenon that the portion of the pigment where the resin has desorbed is likely to undergo decomposition compared with a portion interacting with the resin occurs. It is considered that such a phenomenon has occurred even in short-term ejection. However, the phenomenon has not resulted in a level affecting the ejection stability. However, when such long-term ejection as required in recent years is performed, an adhesion amount of a precipitate formed increases to result in a level affecting an image recorded.

(B) Case of Ink Containing Monoazo Pigment and Surfactant Represented by the Formula (1):

When excess thermal energy is applied to an ink (hereinafter also referred to as "Ink B") containing a monoazo pigment and a surfactant represented by the formula (1) (containing no resin), the present inventors infer that the following phenomenon occurs.

In the ink containing the pigment and the surfactant (hereinafter also referred to as "the surfactant" merely) represented by the formula (1), a propylene oxide group acting as a hydrophobic group of the surfactant hydrophobically interacts with the hydrophobic portion on the surface of the pigment particle. An ethylene oxide group acting as a hydrophilic group of the surfactant retains the affinity for water, whereby the dispersed state thereof is stably held. However, when excess thermal energy is applied to the ink, the state of the surfactant changes to lower the water solubility thereof. As the cause for the lowering of the water solubility of the surfactant, the following is considered. That is, molecular motion becomes vigorous by applying the thermal energy, and a hydrogen bond with water present therearound is easily severed. As the result that the water solubility (hydrophilicity) of the surfactant has been lowered, such a state that molecules of the surfactant become easy to gather is created. Therefore, the amount of the surfactant present around the pigment decreases, and so the ability to inhibit the recrystallization of the pigment is lowered. As a result, the pigment is easily decomposed by the thermal energy applied to the ink, and the subsequent recrystallization cannot also be inhibited, so that such a phenomenon that the occurrence of the precipitate cannot be inhibited occurs. It is considered that such a phenomenon has occurred even in short-term ejection. However, the phenomenon has not resulted in a level affecting the ejection stability. However, when such long-term ejection as required in recent years is performed, an adhesion amount of a precipitate formed increases to result in a level affecting an image recorded.

(C) Case of Ink Containing Monoazo Pigment, Resin And Surfactant:

When Ink A and Ink B were used to perform long-term ejection, the precipitate formed has resulted in the level affecting the ejection stability of the ink. However, when an ink (hereinafter also referred to as "Ink C") containing the monoazo pigment, the resin and the surfactant is used to perform long-term ejection, no precipitate is formed, and the ejection stability of the ink is not lowered. The present inventors infer the reason for it as follows.

When the pigment, resin and surfactant coexist, not only an interaction between the pigment and the resin and an interaction between the pigment and the surfactant, but also an interaction between the resin and the surfactant occurs. Specifically, excess thermal energy is applied to the ink by the long-term ejection; however, it is considered that the occurrence of the precipitate is inhibited by such a mechanism as described below. The resin intends to desorb from the pigment due to the thermal energy applied to the ink. However, the resin also interacts with the surfactant, so that the resin is hard to desorb from the pigment. In addition, the hydrophobicity of the surfactant is heightened by the thermal energy applied, and so molecules of the surfactant become easy to gather. However, the resin present among the molecules of the surfactant inhibits the gathering among the molecules of the surfactant. Further, the surfactant is held in such a condition that the hydrophobicity thereof has been heightened, so that adsorption on the hydrophobic portion on the particle surface of the pigment is more strongly conducted. Incidentally, the hydrophilicity of the surfactant becomes weak due to the gathering of the molecules thereof. However, since the resin is present around the surfactant, the water solubility of the surfactant is retained by the interaction between the surfactant and the resin. As a result, the dispersion stability of the pigment is hardly lowered, and a probability that the thermal energy is applied directly to the particle surface of the pigment to result in decomposition of the pigment is markedly reduced. In addition, even if a part of the pigment is decomposed and recrystallized to form a hydrophobic precipitate, the resin and the surfactant are present in the vicinity of the precipitate formed. Therefore, the precipitate formed immediately interacts with the resin and the surfactant. As a result, it is inferred that hydrophilicity is imparted to the precipitate by the actions of the resin and the surfactant, and so the adhesion of the precipitate is inhibited.

As described above, the problem of lowering the ejection stability, which is caused by the precipitate derived from the monoazo pigment in the ink jet system in which an ink is ejected by the action of thermal energy, can be essentially solved by the constitution (Ink C) of the present invention. That is, according to the present invention, the interaction between the resin and the surfactant is positively utilized in the ink containing the monoazo pigment, whereby the occurrence of the precipitate can be inhibited even when excess thermal energy is applied to the ink due to the long-term ejection.

Regarding deterioration of liquid contact surface of heater portion of recording head:

Case of Ink Containing Monoazo Pigment and Resin:

Even when the Ink A containing the monoazo pigment and the resin (containing no surfactant represented by the formula (1)) is used to perform long-term ejection, a heater is not deteriorated, and a wire for applying a voltage to the heater is not broken. However, an ejection speed may be lowered in some cases. The present inventors infer the mechanism thereof as follows.

When thermal energy is applied to an ink to eject the ink, a part of a pigment contained in the ink is decomposed to lose the hydrophilicity thereof. The pigment from which the hydrophilicity has been lost is liable to adhere to and deposit on a liquid contact surface of a heater portion of a recording head due to a hydrophobic interaction. Like the pigment, a part of a resin contained in the ink is also decomposed to lose the hydrophilicity thereof. The resin from which the hydrophilicity has been lost is liable to adhere to and deposit on the liquid contact surface of the heater portion. In other words, both pigment (or a part of the decomposed product) and resin from which the hydrophilicity has been lost attempt to deposit on the liquid contact surface of the heater portion. According to an investigation by the present inventors, however, it was confirmed that the pigment first deposits on the liquid contact surface of the heater portion. The resin then deposits on the pigment deposited first.

The pigment and the like deposited on the liquid contact surface of the heater portion remain strongly adhered to the liquid contact surface of the heater portion due to the strong hydrophobicity thereof even when the next ejection is conducted. The pigment and the like are present as a lamellar kogation on the liquid contact surface of the heater portion, whereby the deterioration of the heater by repeated ejection is inhibited. In other words, the lamellar kogation formed on the liquid contact surface of the heater portion and derived from the pigment (and the resin) protects the heater. However, the lamellar kogation deposited on the liquid contact surface of the heater portion is composed of the pigment from which the hydrophilicity has been lost. Therefore, this kogation is not removed even when the next ejection is conducted. Accordingly, the lamellar kogation may increase in some cases when long-term ejection is performed. When the lamellar kogation increases, thermal energy generated from the heater is intercepted by the increased lamellar kogation and not applied to the ink. As a result, the ejection speed may be lowered in some cases when Ink A is ejected for a long period of time.

(B) Case of Ink Containing Monoazo Pigment and Surfactant:

It has been found that when Ink B containing the monoazo pigment and the surfactant represented by the formula (1) (containing no resin) is used to perform long-term ejection, the liquid contact surface of the heater portion is deteriorated, and the wire for applying a voltage to the heater may be broken in some cases. The present inventors infer the mechanism thereof as follows.

When thermal energy is applied to an ink to eject the ink, a part of a pigment contained in the ink is decomposed to lose the hydrophilicity thereof. The pigment from which the hydrophilicity has been lost attempts to approach the liquid contact surface of the heater portion due to a hydrophobic interaction. In the case of Ink B, however, the surfactant to which the thermal energy has been applied also attempts to approach the liquid contact surface of the heater portion due to lowering of the hydrophilicity thereof. The surfactant from which the hydrophilicity has been lost is easier to move in the ink when the thermal energy is applied to the ink, and thus adheres to the liquid contact surface of the heater portion earlier than the pigment from which the hydrophilicity has been lost. The pigment further adheres on to the surfactant earlier adhered.

However, the interaction between the surfactant adhered and the liquid contact surface of the heater portion is not so strong. Therefore, it has been found that the surfactant adhered is easily removed by the next ejection. That is, the surfactant and pigment adhere to the liquid contact surface of the heater portion, but are discharged from an ink flow path by the next ejection. Thus, a precipitate is apparently scarcely present on the liquid contact surface of the heater portion. According to a further investigation by the present inventors, it has been found that when long-term ejection is performed under such circumstances, the liquid contact surface of the heater portion is deteriorated because a layer capable of inhibiting the deterioration of the liquid contact surface of the heater portion is not present. As a result that the liquid contact surface of the heater portion has been deteriorated, it has been found that a wire for applying a voltage to the heater may be broken in some cases.

(C) Case of Ink Containing Monoazo Pigment, Resin and Surfactant:

A wire for applying a voltage to the heater is not broken, and lowering of the ejection speed does also not occur when Ink C containing the monoazo pigment, resin and surfactant is used to perform long-term ejection. The present inventors infer the mechanism thereof as follows.

When thermal energy is applied to Ink C, the hydrophilicity of each of the pigment, resin and surfactant is lost. As a result, all the components from which the hydrophilicity has been lost are liable to adhere to the liquid contact surface of the heater portion like Ink A and Ink B. First, the surfactant attempts to approach the liquid contact surface of the heater portion. However, an interaction between the surfactant and the resin and an interaction between the surfactant and the pigment are also present, so that such a layer that the surfactant, pigment and resin are present mixedly is formed on the liquid contact surface of the heater portion. Thereafter, the surfactant is present in the layer in which the respective components are mixed, so that the layer is easily removed from the liquid contact surface when the next ejection is conducted, and discharged from an ink flow path. At a portion on which the pigment from which the hydrophilicity has been lost deposits, a deposit stays on the liquid contact surface of the heater portion even when the next ejection is conducted, so that an action of protecting the heater also occurs at the same time. That is, according to the ink (Ink C) of the present invention that contains the pigment, resin and surfactant, a layer of the pigment does not overdeposit even when the long-term ejection is conducted. In addition, a conventionally unexpectable effect that the deterioration of the liquid contact surface of the heater portion is inhibited can be achieved.

Ink:

The respective components constituting the ink according to the present invention will hereinafter be described.

Monoazo Pigment:

A coloring material constituting the ink according to the present invention is required to be a monoazo pigment of a self-dispersible type. No particular limitation is imposed on the kind of the monoazo pigment, and any publicly know pigment may be used. Specific examples thereof include C.I. Pigment Yellow: 1, 2, 3, 5, 6, 49, 61, 62:1, 65, 73, 74, 75, 97, 98, 111, 116, 130, 133, 168 and 169; C.I. Pigment Orange 1; and C.I. Pigment Red 269. In the present invention, at least one selected from the group consisting of C.I. Pigment Yellow 1, C.I. Pigment Yellow 74 and C.I. Pigment Red 269 is favorably used because higher color developability is achieved in the resulting image. Among these pigments, C.I. Pigment Yellow 74 is particularly favorably used. The content (% by mass) of the monoazo pigment in the ink is preferably 2.5% by mass or more and 10.0% by mass or less, more favorably 3.0% by mass or more and 6.0% by mass or less, based on the total mass of the ink.

The monoazo pigment of the self-dispersible type is a monoazo pigment to the particle surface of which a hydrophilic group is bonded directly or through another atomic group. This hydrophilic group is at least one selected from the group consisting of —COOM, —$SO_3M$, —$PO_3HM$ and —$PO_3M_2$. M in the formulae is a hydrogen atom, alkali metal, ammonium or organic ammonium. As examples of said another atomic group (—R—), may be mentioned linear or branched alkylene groups having 1 to 12 carbon atoms, arylene groups such as a phenylene and naphthylene groups, an amide group, a sulfonyl group, an amino group, a carbonyl group, an ester group and an ether group. Groups with these groups combined may also be mentioned. As specific examples of the alkali metal represented by M in the above formulae, may be mentioned lithium, sodium and potassium. Specific examples of the organic ammonium represented by M in the above formulae include ions of alkylamines having 1 to 3 carbon atoms, such as methylamine and ethylamine; and alkanolamines having 1 to 4 carbon atoms, such as monoethanolamine, diethanolamine and triethanolamine. When the hydrophilic group forms a salt, the salt in the ink may be in either one of a partially dissociated state and a wholly dissociated state. In the present invention, a monoazo pigment whose hydrophilic group is —$SO_3M$ and a monoazo pigment whose another atomic group is an arylene group are favorable. A monoazo pigment to the particle surface of which —$C_6H_4$—$SO_3M$ is bonded is particularly favorably used because the resulting ink becomes excellent in storage stability.

The monoazo pigment used in the present invention may preferably be a self-dispersible pigment to the particle surface of which at least one hydrophilic group selected from the group consisting of —COOM, —$SO_3M$, —$PO_3HM$ and —$PO_3M_2$ is bonded through at least one another atomic group selected from the group consisting of an alkylene group, an arylene group, an amide group, a sulfonyl group, an amino group, a carbonyl group, an ester group and an ether group. On the other hand, the monoazo pigment may also be that subjected to a surface oxidation treatment, that is, a self-dispersed pigment to the particle surface of which at least one hydrophilic group is bonded directly. As examples of such a monoazo pigment, may be mentioned those obtained by, for example, a method in which an oxidation treatment with sodium hypochlorite, an underwater ozone treatment or an ozone treatment is conducted, and wet oxidation with an oxidizing agent is then conducted to modify the surface of a pigment particle. Incidentally, pigments (for example, a resin-dispersible pigment, a microcapsule pigment and a resin-bonded pigment) of other dispersion systems may also be further used in combination so far as the effects of the present invention are achieved.

A resin having an acid value within a specific numeral range is caused to be contained in the ink according to the present invention. However, this resin is a component contained to expect to impart an action of assisting the dispersion of the monoazo pigment of the self-dispersible type. Therefore, this resin is not a component contained to expect to disperse the pigment by its action alone. That is, "self-dispersible" in the present invention does not means that a resin compound such as a resin, or a compound having surface activating ability adsorbs on the particle surface of a pigment, and the pigment is basically dispersed by only a dispersing action of such a compound. In the present invention, "self-dispersible pigment" is a pigment to the particle surface of which a predetermined hydrophilic group is chemically bonded directly or through another atomic group, and such a pigment particle can be dispersed by the action of the hydrophilic group bonded. In other words, "self-dispersible pigment" in the present invention is different from what is called a resin-dispersible pigment that dispersion of the pigment is achieved by adsorbing or bonding a resin (dispersant) to the particle surface of the pigment. That is, the self-dispersible type monoazo pigment used in the present invention can be dispersed without using the above-described specific resin.

Resin:

The ink according to the present invention is required to cause a resin having an acid value of 240 mg KOH/g or less to be contained therein. As described above, this resin is a component contained to expect to impart an action of assisting the dispersion of the monoazo pigment of the self-dispersible type and is favorably water-soluble. Incidentally, in the present invention, "a resin is water-soluble" means that the resin does not form a particle whose particle size is measurable when the resin is neutralized with an alkali equivalent to the acid value of the resin. Such a resin is described as "a water-soluble resin" in the present invention. The content (% by mass) of this resin in the ink is favorably 1.0% by mass or more and 5.0% by mass or less, more favorably 1.0% by mass or more and 3.0% by mass or less, based on the total mass of the ink.

The acid value of the resin is relevant to hydrophilicity/hydrophobicity of the resin. There is a tendency for the resin to increase the hydrophobicity as the acid value becomes low and become easy to be adsorbed on the particle surface of the pigment. When the acid value of the resin is lowered to a certain degree or less, the dispersed state of the pigment can be stably retained even when thermal energy is applied to the ink, and so the ejection stability of the ink is improved. Therefore, there is a need to control the acid value of the resin to 240 mg KOH/g or less in the present invention. If the acid value of the resin is more than 240 mg KOH/g, the resin is scarcely adsorbed on the particle surface of the pigment because the hydrophilicity of the resin is too high, so that the dispersed state of the pigment cannot be stably retained when thermal energy is applied to the ink, and so the ejection stability of the ink is not improved. In the present invention, the acid value of the resin is favorably 170 mg KOH/g or less for causing the hydrophobicity of the resin to be more heightened to make it easy to be adsorbed on the particle surface of the pigment and retaining the ejection stability of the ink at a high level. Incidentally, if the acid value of the resin is too low, the resin is easy to aggregate by an interaction between resin molecules and may be hard in some cases to cause it to be stably present in an aqueous medium constituting the ink. Therefore, the lower limit of the acid value of the resin is controlled to favorably 100 mg KOH/g or more, more favorably 150 mg KOH/g or more.

In the present invention, the content (% by mass) of the resin in the ink is favorably 0.25 times or more and 1.0 time or less in terms of mass ratio as much as the content (% by mass) of the monoazo pigment. That is, (content (% by mass) of the resin)/(content (% by mass) of the monoazo pigment) is favorably 0.25 times or more and 1.0 time or less. Incidentally, the contents of the resin and monoazo pigment in this case are values based on the total mass of the ink. When the amount of the resin added to the ink containing a fixed amount of the pigment is increased, the resin adsorbed on the pigment increases, so that the dispersed state of the pigment can be more stably retained even when thermal energy is applied to the ink. Therefore, there is a tendency for the resulting ink to achieve high-level ejection stability. If the mass ratio is less than 0.25 times, the amount of the resin to the pigment becomes too small, and so it may be hard in some cases to stably retain the dispersed state of the pigment when the thermal energy is applied to the ink, and the high-level ejection stability of the ink may not be sufficiently achieved in some cases. If the mass ratio is more than 1.0 time on the other hand, the amount of the resin to the pigment becomes too large, and so the resin remaining without being adsorbed on the pigment interacts with the surfactant represented by the formula (1). As a result, the amount of the surfactant represented by the formula (1), which should be used for stably retaining the dispersed state of the pigment, may become insufficient in some cases, and the high-level ejection stability of the ink may not be sufficiently achieved in some cases.

The resin used in the present invention is favorably a water-soluble resin having at least such a hydrophilic unit and a hydrophobic unit as mentioned below as constituent units. Incidentally, "(meth)acryl" in the following description means both acryl and methacryl.

The hydrophilic unit can be formed by, for example, polymerizing a monomer having a hydrophilic group. As specific examples of the monomer having the hydrophilic group, may be mentioned acid monomers having a carboxyl group, such as (meth)acrylic acid, itaconic acid, maleic acid and fumaric acid, and anionic monomers such as anhydrides and salts of these acid monomers; monomers having a hydroxy group, such as 2-hydroxyethyl (meth)acrylate and 3-hydroxypropyl (meth)acrylate; and monomers having an ethylene oxide group, such as methoxy(mono, di, tri, polyethylene glycol (meth)acrylate.

Examples of a cation forming the salt with the acid monomer include ions of lithium, sodium, potassium, ammonium and organic ammonium. Since the resin used in the present invention has an acid value, the hydrophilic unit contains a unit derived from such an anionic monomer as mentioned above. Incidentally, the resin is favorably neutralized with a neutralizing agent such as the hydroxide of an alkali metal (lithium, sodium or potassium) or aqueous ammonia to become water-soluble.

The hydrophobic unit can be formed by, for example, polymerizing a monomer having a hydrophobic group. As specific examples of the monomer having the hydrophobic group, may be mentioned monomers having an aromatic ring, such as styrene, α-methylstyrene and benzyl (meth)acrylate; and monomers having an aliphatic group, such as ethyl (meth)acrylate, methyl (meth)acrylate, (iso)propyl (meth)acrylate, (n-, iso-, t-)butyl (meth)acrylate and 2-ethylhexyl (meth)acrylate.

In the present invention, a water-soluble resin having at least a unit derived from (meth)acrylic acid as the hydrophilic unit and a unit derived from a monomer having an aromatic ring as the hydrophobic unit is favorably used. A water-soluble resin having at least a unit derived from acrylic acid as the hydrophilic unit and a unit derived from at least one monomer of styrene and α-methylstyrene as the hydrophobic unit is more favorably used. Such a water-soluble resin is favorable because its interactions with the surfactant and the pigment is particularly easy to occur.

No limitation is imposed on the form of the resin, a copolymer of a form such as random, block or graft may be used. The weight average molecular weight of the resin is favorably 1,000 or more and 30,000 or less, more favorably 3,000 or more and 15,000 or less.

Surfactant:

The ink according to the present invention contains a surfactant represented by the following formula (1). This surfactant is a polyoxyethylene-polyoxypropylene copolymer (Pluronic type surfactant), and the addition form of the ethylene oxide group and the propylene oxide group includes a random type and a block type. That is, the surfactant is formally represented as a structural formula of the following formula (1). However, the ethylene oxide group (—$CH_2$—$CH_2$—O—) and the propylene oxide group (—$CH_2$—$CH(CH_3)$—O—) may be arranged in any order.

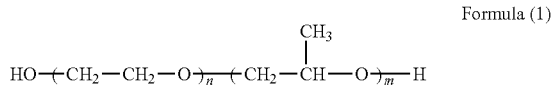

Formula (1)

wherein n is 1.0 or more, and m is 1.0 or more.

n in the formula (1) designates the amount (mol) of the ethylene oxide group added, and m designates the amount (mol) of the propylene oxide group added. Since the surfactant represented by the formula (1) is generally a mixture whose molecular weight distribution falls within a certain range, the molecular weight thereof, and the numbers of moles of the respective groups added are indicated as average values. In the present specification, however, the expression of containing "the surfactant represented by the formula (1)" is used including the case where the surfactant is a mixture. The content (% by mass) of the surfactant represented by the formula (1) is favorably 0.05% by mass or more and 5.0% by mass or less, more favorably 0.1% by mass or more and 3.0% by mass or less, based on the total mass of the ink.

The addition form of the ethylene oxide group and the propylene oxide group in the surfactant represented by the formula (1) may be any type of block and random types. However, the block type is more favorable. Among others, such a form that a block of the ethylene oxide group is bonded to both ends of the propylene oxide group is particularly favorable. The weight average molecular weight of the surfactant represented by the formula (1) is favorably 800 or more and 22,000 or less, more favorably 800 or more and 10,000 or less. Incidentally, the weight average molecular weight of the surfactant represented by the formula (1) in the present invention can be measured by, for example, gel permeation chromatography using tetrahydrofuran as a mobile phase.

The proportion of a molecular weight of an ethylene oxide group moiety occupying the surfactant is required to be 10% or more and 85% or less. Incidentally, the proportion can be calculated out from the values of n and m in the formula (1). If the proportion is less than 10%, the hydrophobicity of the surfactant becomes too high. Therefore, the hydrophobic interaction between the pigment and the surfactant is easy to occur. However, the action of stabilizing the precipitate of the monoazo pigment is not developed. If the proportion is more than 85% on the other hand, the hydrophilicity of the surfactant becomes considerably high, and so the interaction between the pigment and the surfactant cannot be caused. Accordingly, if the proportion is less than 10% or more than 85%, the effect of the present invention that the lowering of the ejection stability by the precipitate of the monoazo pigment is inhibited cannot be achieved. In addition, in order to more stabilize the precipitate of the monoazo pigment and achieve the ejection stability of the ink at a high level, it is effective to set the proportion of the molecular weight of the ethylene oxide group moiety occupying the surfactant represented by the formula (1) high to some extent. Thus, in the present invention, the proportion is favorably 41% or more and 85% or less, more favorably 57% or more and 85% or less. In the present invention, n is favorably 7.9 or more and 450.0 or less, i.e., 7.9≤n≤450.0, more favorably 7.9 or more and 200.0 or less, i.e., 7.9≤n≤200.0.

The proportion of the molecular weight of the ethylene oxide group moiety occupying the surfactant can be determined from the ink containing the surfactant represented by the formula (1) in the following manner. First, the ink is dissolved in an organic solvent (eluent) to prepare a sample for measurement. With respect to this sample for measurement, components constituting the ink are separated by means of a gel permeation chromatograph equipped with a differential refractive index detector. At this time, the kind of the organic solvent used as the eluent, and the kind(s) and number of column(s) used in the separation are suitably changed, whereby surfactants different in weight average molecular weight and in composition can be separated. An eluent passed through the differential refractive index detector is taken out, and a component is dried to solid, thereby isolating a surfactant. With respect to the resultant surfactant, the amount (mol), i.e. value 'n', of the ethylene oxide group added and the amount (mol), i.e. value 'm', of the propylene oxide group added can be known by NMR. The proportion of the molecular weight of the ethylene oxide group moiety occupying the surfactant can be calculated from the values n and m determined in this manner.

In the present invention, the content (% by mass) of the surfactant represented by the formula (1) in the ink is favorably 0.05 times or more and 0.5 times or less in terms of mass ratio as much as the content (% by mass) of the monoazo pigment. That is, (content (% by mass) of the surfactant represented by the formula (1))/(content (% by mass) of the monoazo pigment) is favorably 0.05 times or more and 0.5 time or less. Incidentally, the contents of the surfactant represented by the formula (1) and the monoazo pigment in this case are values based on the total mass of the ink. When the amount of the surfactant added to the ink containing a fixed amount of the pigment is increased, the interaction between the monoazo pigment and the surfactant is easier to occur. Thus, the action of stabilizing the precipitate of the monoazo pigment is enhanced. If the mass ratio is less than 0.05 times, the amount of the surfactant to the monoazo pigment becomes too small, and so the high-level ejection stability of the ink may not be sufficiently achieved in some cases. However, if the mass ratio is too high, the amount of the surfactant to the monoazo pigment becomes too large, so that the surfactant is easy to interact with each other, and so the action of stabilizing the precipitate of the monoazo pigment by the interaction between the monoazo pigment and the surfactant may not be sufficiently developed in some cases. As a result, the high-level ejection stability of the ink may not be sufficiently achieved in some cases. Accordingly, the mass ratio is favorably 0.5 times or less.

As described above, m in the surfactant represented by the formula (1) designates the amount (mol) of the propylene oxide group added. In the present invention, m is favorably 10.0 or more and 60.0 or less, i.e., $10.0 \leq m \leq 60.0$. The number of the propylene oxide group that is the hydrophobic group in the surfactant increases as the value m is larger. Therefore, the interaction between the monoazo pigment and the surfactant is easier to occur, and the action of stabilizing the precipitate of the monoazo pigment is enhanced. If the value m is less than 10.0, the interaction between the monoazo pigment and the surfactant is hard to occur, so that the high-level ejection stability of the ink may not be sufficiently achieved in some cases. However, if the value m is too large, the number of the propylene oxide groups that are hydrophobic groups in the surfactant becomes too large, and so the surfactant is easy to interact with each other rather than the interaction with the monoazo pigment. Thus, the action of stabilizing the precipitate of the monoazo pigment by the interaction between the monoazo pigment and the surfactant may not be sufficiently developed in some cases. As a result, the high-level ejection stability of the ink may not be sufficiently achieved in some cases. Accordingly, the value m is favorably 60.0 or less.

Aqueous Medium:

Water or a mixed solvent of water and a water-soluble organic solvent is favorably contained as an aqueous medium in the ink according to the present invention. In the present invention, the ink is favorably an aqueous ink containing at least water as the aqueous medium. Deionized water or ion-exchanged water is favorably used as water. The content (% by mass) of water in the ink is favorably 50.0% by mass or more and 95.0% by mass or less based on the total mass of the ink. As the water-soluble organic solvent, may be used any of publicly known water-soluble organic solvents heretofore generally used in, for example, an ink for ink jet. One or more water-soluble organic solvents may be used. Specific examples thereof include monohydric or polyhydric alcohols, alkylene glycols the alkylene group of which has about 1 to carbon atoms, polyethylene glycols having an average molecular weight of about 200 to 2,000, glycol ethers and nitrogen-containing compounds. The content (% by mass) of the water-soluble organic solvent in the ink is favorably 3.0% by mass or more and 50.0% by mass or less based on the total mass of the ink.

Other Components:

In addition to the above-described components, an organic compound that is solid at ordinary temperature (25° C.), such as trimethylolethane or trimethylolpropane, or a nitrogen-containing compound such as urea or ethyleneurea, may also be contained in the ink according to the present invention as needed. In addition to the above-described components, various additives such as another surfactant, a pH adjustor, an antifoaming agent, a rust preventive, a preservative, a mildewproofing agent, an antioxidant, an anti-reducing agent, an evaporation accelerator and a chelating agent may also be further contained in the ink as needed. In particular, the surface tension of the ink according to the present invention is favorably controlled with a water-soluble organic solvent such as a 1,2-alkanediol or a glycol ether or a nonionic surfactant to obtain an ink having a surface tension capable of being applied to ejection operation by ink jet. The content (% by mass) of the water-soluble organic solvent such as a 1,2-alkanediol or a glycol ether in the ink is favorably 0.0% by mass or more and 1.0% by mass or less based on the total mass of the ink. Specific examples of the nonionic surfactant include polyoxyethylene alkyl ethers, acetylene alcohols and ethylene oxide adducts of acetylene glycol. The content (% by mass) of the nonionic surfactant in the ink is favorably 0.01% by mass or more and 3.0% by mass or less based on the total mass of the ink.

Ink Cartridge:

The ink cartridge according to the present invention is provided with an ink and an ink storage portion storing this ink. The ink stored in the ink storage portion is the above-described ink according to the present invention. The structure of the ink cartridge is such that the ink storage portion is formed by an ink storage chamber storing a liquid ink and a negative pressure generating member storing chamber storing a negative pressure generating member holding the ink in the interior thereof by a negative pressure. The ink storage portion of the ink cartridge may also be so constructed that the whole amount of the ink stored is held in the negative pressure generating member without providing the ink storage chamber storing a liquid ink. In addition, the ink cartridge may be constructed so as to have an ink storage portion and a recording head as described below.

Ink Jet Recording Method:

The ink jet recording method according to the present invention is a method of ejecting the above-described ink according to the present invention by a recording head of an ink jet system to record an image on a recording medium. In the present invention, an ink jet recording method utilizing a system in which thermal energy is applied to an ink as a system for ejecting the ink is adopted. Steps of the ink jet recording method may be those publicly known except that the ink according to the present invention is used.

The recording head used in the present invention is of the system in which an ink is ejected by the action of thermal energy, and the structure thereof may be that publicly known. A specific structure of the recording head include that whose heater portion for applying heat for ejecting an ink to the ink is formed by a heating resistor and a wire for applying a voltage to the heating resistor. In addition, a protecting layer containing a metal such as Ta, Zr, Ti, Ni, Al or W or an oxide thereof may also be provided on a liquid contact surface of the heater portion as needed.

EXAMPLES

The present invention will hereinafter be described more specifically by the following Examples, Comparative Examples and Reference Example. However, the present invention is not limited by the following examples unless going beyond the gist of the present invention. Incidentally, all designations of "part" or "parts" and "%" as to amounts of components described below are based on mass unless expressly noted. Various physical property values are values measured at 25° C.

Preparation of Water-Soluble Resin:

The monomers (unit: part) shown in the upper part of Table 1 were copolymerized according to a method known per se in the art to synthesize water-soluble resins A to F. Each of the resultant resins was used to prepare an aqueous resin solution in the following manner. Specifically, a 10.0% aqueous solution of sodium hydroxide was used to neutralize all acidic groups in the resin, and ion-exchanged water was then added to obtain aqueous resin solutions A to F each having a resin content (solid content) of 10.0%. Properties of the respective resins are shown in the lower part of Table 1.

TABLE 1

| | | Composition and Properties of resin | | | | | |
|---|---|---|---|---|---|---|---|
| | | Resin A | Resin B | Resin C | Resin D | Resin E | Resin F |
| Monomers used in synthesis | Styrene | 67 | 64 | 63 | 63 | 43 | 42 |
| | Butyl acrylate | 20 | 20 | | | 20 | 20 |
| | Benzyl methacrylate | | | 15 | 14 | | |
| | Methacrylic acid | | | | | 37 | 38 |
| | Acrylic acid | 13 | 16 | 22 | 23 | | |
| Properties | Acid value [mg KOH/g] | 100 | 120 | 170 | 175 | 240 | 250 |
| | Weight average molecular weight | 10,000 | 10,000 | 10,000 | 10,000 | 10,000 | 10,000 |
| | Form | Random | Random | Random | Random | Random | Random |

Preparation of Pigment Dispersion Liquid:

Pigment Dispersion Liquid A

Hydrochloric acid obtained by dissolving 5 g of concentrated hydrochloric acid in 5.5 g of water was cooled to 5° C., and 2.0 g of 4-aminobenzenesulfonic acid was added to obtain a solution. A container containing the resultant solution was placed in an ice bath, and the solution was stirred to constantly keep the temperature of the solution to 10° C. or less. An aqueous solution with 2.4 g of sodium nitrite dissolved in 9 g of water at 5° C. was added into this solution. After this solution was stirred for additional 15 minutes, 6 g of C.I. Pigment Yellow 74 (monoazo pigment) having a specific surface area of 65.5 m$^2$/g was added under stirring, and the stirring was conducted for additional 15 minutes to obtain a slurry. After the resultant slurry was filtered through a filter paper (trade name "Standard Filter Paper No. 2"; product of Advantec Co.), the resultant particles were fully washed with water and dried in an oven controlled to 110° C., thereby preparing a self-dispersible type monoazo pigment A to the particle surface of which a —$C_6H_4$—$SO_3Na$ group was bonded. Water was added to the resultant monoazo pigment A to disperse the pigment so as to give a pigment content of 20.0%, thereby preparing a pigment dispersion liquid A.

Pigment Dispersion Liquid B

A self-dispersible type monoazo pigment B to the particle surface of which a —$C_6H_4$—COONa group was bonded was prepared in the same manner as in the pigment dispersion liquid A described above except that 4-amino-benzenesulfonic acid was changed to p-aminobenzoic acid. Water was added to the resultant monoazo pigment B to disperse the pigment so as to give a pigment content of 20.0%, thereby preparing a pigment dispersion liquid B.

Pigment Dispersion Liquid C

A self-dispersible type monoazo pigment C to the particle surface of which a —$C_6H_4$—$PO_3Na_2$ group was bonded was prepared in the same manner as in the pigment dispersion liquid A described above except that 4-amino-benzenesulfonic acid was changed to 4-aminophenylphosphonic acid. Water was added to the resultant monoazo pigment C to disperse the pigment so as to give a pigment content of 20.0%, thereby preparing a pigment dispersion liquid C.

Pigment Dispersion Liquid D

A reactor was charged with 500 g of C.I. Pigment Yellow 74 (monoazo pigment), 45 g of aminophenyl (2-sulfoethyl) sulfone (APSES) and 900 g of distilled water. The contents were then stirred for 20 minutes at 300 rpm and 55° C. to obtain a mixture. After 40 g of a 25% aqueous solution of sodium nitrite was added over 15 minutes into the resultant mixture, and 50 g of distilled water was further added, a reaction was conducted for 2 hours at 60° C. The reaction product was taken out while being diluted, thereby adjusting the reaction product so as to give a solid content of 15.0%. Thereafter, impurities were removed by centrifugation to obtain a dispersion liquid 1. A pigment to the particle surface of which APSES was bonded was contained in the resultant dispersion liquid 1.

The following operation was then conducted for determining the amount (mol) of the group (APSES) bonded to the pigment in the resultant dispersion liquid 1. A sodium ion electrode (trade name "1512A-10C"; manufactured by Horiba Ltd.) was used to measure a concentration of a sodium ion in the dispersion liquid 1 to convert it to the amount (mol) per the solid content of the pigment. The dispersion liquid 1 whose solid content was 15.0% was then added dropwise over 1 hour into a solution of pentaethylenehexamine (PEHA) while being vigorously stirred, thereby obtaining a mixture. Incidentally, the concentration of PEHA in the PEHA solution was controlled to 2 to 3 times as much as the amount (mol) of the sodium ion measured above, and the amount of the PEHA solution was determined to be equal to the amount of the dispersion liquid 1. After the resultant mixture was stirred for 48 hours, impurities were removed to obtain a dispersion liquid 2. A pigment to the particle surface of which PEHA was bonded through APSES was contained in the resultant dispersion liquid 2, and the solid content thereof was 10.0%.

Five hundred grams of the dispersion liquid 2 whose solid content was 10.0% was added dropwise into an aqueous solution of a styrene-acrylic acid copolymer (weight average molecular weight: 15,000, acid value: 140 mg KOH/g, polydispersity: 1.5), which is a water-soluble resin, under stirring, thereby obtaining a mixture. Incidentally, the aqueous solution used at that time is obtained by adding 1,800 g of distilled water into 190 g of the styrene-acrylic acid copolymer, further adding sodium hydroxide necessary for neutralizing the resin and dissolving the resin under stirring. Incidentally, the polydispersity (Mw/Mn) means a ratio of a weight average molecular weight Mw to a number average molecular weight Mn. The resultant mixture was transferred to a PYREX (trademark) evaporating dish and heated for 15 hours at 150° C. to evaporate volatile matter, and the resultant evaporatively dried product was then cooled to room temperature. The resultant evaporatively dried product was then added into distilled water whose pH was adjusted to 9.0 with sodium hydroxide and dispersed by means of a dispersing machine. A 1.0 mol/L aqueous solution of sodium hydroxide wad further added under stirring to adjust the pH of the liquid to 10 to 11. Thereafter, desalting was conducted, impurities and coarse particles were removed, and the resin which was not bonded to the pigment was removed, thereby preparing a pigment dispersion liquid D. A pigment to the particle surface of which the resin was bonded was contained in the resultant dispersion liquid D, the solid content thereof was 20.0%, the pH of the dispersion liquid was 10.1, and the average particle size of the pigment was 130 nm. Since the resin is bonded to the particle surface of the pigment in the resultant pigment dispersion liquid D, this pigment is different from "the self-dispersible type monoazo pigment" used in the present invention.

Synthesis of Surfactant

Compounds 1 to 25, which are surfactants represented by the formula (1), shown in Table 2 were synthesized according to a method known per se in the art. Specifically, a component to become an ethylene oxide group was added to polypropylene glycol to synthesize a compound of such a form that a block of an ethylene oxide group is bonded to both ends of a block of a propylene oxide group. Accordingly, the value n (amount (mol) of the ethylene oxide group added) indicates the total value of the two blocks of the ethylene oxide group. The proportion (proportion [%] of EO group) of the ethylene oxide group occupying the surfactant was calculated from the values n and m obtained by conducting NMR analysis on each of the compounds synthesized.

TABLE 2

| Surfactant represented by the formula (1) | | | |
|---|---|---|---|
| | Value n | Value m | Proportion of EO group [%] |
| Compound 1 | 81.3 | 16.4 | 79 |
| Compound 2 | 149.8 | 30.2 | 79 |
| Compound 3 | 277.7 | 56.0 | 79 |
| Compound 4 | 29.2 | 16.4 | 57 |
| Compound 5 | 53.3 | 30.2 | 57 |
| Compound 6 | 98.3 | 56.0 | 57 |
| Compound 7 | 125.0 | 16.4 | 85 |
| Compound 8 | 228.0 | 30.2 | 85 |
| Compound 9 | 420.0 | 56.0 | 85 |
| Compound 10 | 27.5 | 16.4 | 56 |
| Compound 11 | 50.7 | 30.2 | 56 |
| Compound 12 | 94.0 | 56.0 | 56 |
| Compound 13 | 15.3 | 16.4 | 41 |
| Compound 14 | 27.9 | 30.2 | 41 |
| Compound 15 | 51.5 | 56.0 | 41 |
| Compound 16 | 14.4 | 16.4 | 40 |
| Compound 17 | 26.5 | 30.2 | 40 |
| Compound 18 | 49.2 | 56.0 | 40 |
| Compound 19 | 8.9 | 10.0 | 40 |
| Compound 20 | 52.7 | 60.0 | 40 |
| Compound 21 | 8.1 | 9.0 | 40 |
| Compound 22 | 53.6 | 61.0 | 40 |
| Compound 23 | 9.0 | 61.0 | 10 |
| Compound 24 | 8.0 | 61.0 | 9 |
| Compound 25 | 494.5 | 61.0 | 86 |

Preparation of Ink (Examples 1 to 49, Comparative Examples 1 to 6 and Reference Example 1)

After the components (unit: %) shown in the upper part of Tables 3-1 to 3-5 were mixed and sufficiently stirred, the respective mixtures were filtered under pressure through a microfilter (product of Fuji Film Co., Ltd.) having a pore size of 1.0 μm to prepare respective inks of Examples, Comparative Examples and Reference Example. Incidentally, "ACETYLENOL E100" in Tables 3-1 to 3-5 is a surfactant produced by Kawaken Fine Chemicals Co., Ltd. In the lower part of Tables 3-1 to 3-5 are shown Content A [%] of a pigment, Content B [%] of a resin, Content C [%] of a surfactant represented by the formula (1), value [times] (Content B of the resin)/(Content A of the pigment) and value [times] (Content C of the surfactant represented by the formula (1))/(Content A of the pigment) in each ink.

TABLE 3-1

| Composition and Properties of ink | | | | | | | | | | | | | |
|---|---|---|---|---|---|---|---|---|---|---|---|---|---|
| | Example | | | | | | | | | | | | |
| | 1 | 2 | 3 | 4 | 5 | 6 | 7 | 8 | 9 | 10 | 11 | 12 | 13 |
| Pigment dispersion A | 20.0 | 20.0 | 20.0 | 20.0 | 20.0 | 20.0 | 20.0 | 20.0 | 20.0 | 20.0 | 20.0 | 20.0 | 20.0 |
| Pigment dispersion B | | | | | | | | | | | | | |
| Pigment dispersion C | | | | | | | | | | | | | |
| Pigment dispersion D | | | | | | | | | | | | | |
| Resin A | | | | | | | | | | | | | |
| Resin B | 15.0 | 15.0 | 15.0 | 15.0 | 15.0 | 15.0 | 15.0 | 15.0 | 15.0 | 15.0 | 15.0 | 15.0 | 15.0 |
| Resin C | | | | | | | | | | | | | |
| Resin D | | | | | | | | | | | | | |
| Resin E | | | | | | | | | | | | | |
| Resin F | | | | | | | | | | | | | |

TABLE 3-1-continued

Composition and Properties of ink

| | | \multicolumn{13}{c}{Example} |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Surfactant represented by the formula (1) | Compound 1 | 1.0 | | | | | | | | | | | | |
| | Compound 2 | | 1.0 | | | | | | | | | | | |
| | Compound 3 | | | 1.0 | | | | | | | | | | |
| | Compound 4 | | | | 1.0 | | | | | | | | | |
| | Compound 5 | | | | | 1.0 | | | | | | | | |
| | Compound 6 | | | | | | 1.0 | | | | | | | |
| | Compound 7 | | | | | | | 1.0 | | | | | | |
| | Compound 8 | | | | | | | | 1.0 | | | | | |
| | Compound 9 | | | | | | | | | 1.0 | | | | |
| | Compound 10 | | | | | | | | | | 1.0 | | | |
| | Compound 11 | | | | | | | | | | | 1.0 | | |
| | Compound 12 | | | | | | | | | | | | 1.0 | |
| | Compound 13 | | | | | | | | | | | | | 1.0 |
| | Compound 14 | | | | | | | | | | | | | |
| | Compound 15 | | | | | | | | | | | | | |
| | Compound 16 | | | | | | | | | | | | | |
| | Compound 17 | | | | | | | | | | | | | |
| | Compound 18 | | | | | | | | | | | | | |
| | Compound 19 | | | | | | | | | | | | | |
| | Compound 20 | | | | | | | | | | | | | |
| | Compound 21 | | | | | | | | | | | | | |
| | Compound 22 | | | | | | | | | | | | | |
| | Compound 23 | | | | | | | | | | | | | |
| | Compound 24 | | | | | | | | | | | | | |
| | Compound 25 | | | | | | | | | | | | | |
| Glycerol | | 15.0 | 15.0 | 15.0 | 15.0 | 15.0 | 15.0 | 15.0 | 15.0 | 15.0 | 15.0 | 15.0 | 15.0 | 15.0 |
| 2-Pyrrolidone | | 5.0 | 5.0 | 5.0 | 5.0 | 5.0 | 5.0 | 5.0 | 5.0 | 5.0 | 5.0 | 5.0 | 5.0 | 5.0 |
| ACETYLENOL E100 | | 0.8 | 0.8 | 0.8 | 0.8 | 0.8 | 0.8 | 0.8 | 0.8 | 0.8 | 0.8 | 0.8 | 0.8 | 0.8 |
| Water | | 43.2 | 43.2 | 43.2 | 43.2 | 43.2 | 43.2 | 43.2 | 43.2 | 43.2 | 43.2 | 43.2 | 43.2 | 43.2 |
| Content A of pigment [%] | | 4.0 | 4.0 | 4.0 | 4.0 | 4.0 | 4.0 | 4.0 | 4.0 | 4.0 | 4.0 | 4.0 | 4.0 | 4.0 |
| Content B of resin [%] | | 1.5 | 1.5 | 1.5 | 1.5 | 1.5 | 1.5 | 1.5 | 1.5 | 1.5 | 1.5 | 1.5 | 1.5 | 1.5 |
| Content C of surfactant represented by the formula (1) [%] | | 1.0 | 1.0 | 1.0 | 1.0 | 1.0 | 1.0 | 1.0 | 1.0 | 1.0 | 1.0 | 1.0 | 1.0 | 1.0 |
| Value B/A [times] | | 0.38 | 0.38 | 0.38 | 0.38 | 0.38 | 0.38 | 0.38 | 0.38 | 0.38 | 0.38 | 0.38 | 0.38 | 0.38 |
| Value C/A [times] | | 0.25 | 0.25 | 0.25 | 0.25 | 0.25 | 0.25 | 0.25 | 0.25 | 0.25 | 0.25 | 0.25 | 0.25 | 0.25 |

TABLE 3-2

Composition and Properties of ink

| | | \multicolumn{13}{c}{Example} |
|---|---|---|---|---|---|---|---|---|---|---|---|---|---|---|
| | | 14 | 15 | 16 | 17 | 18 | 19 | 20 | 21 | 22 | 23 | 24 | 25 | 26 |
| Pigment dispersion A | | 20.0 | 20.0 | 20.0 | 20.0 | 20.0 | 20.0 | 20.0 | 20.0 | 20.0 | 20.0 | 20.0 | 20.0 | 20.0 |
| Pigment dispersion B | | | | | | | | | | | | | | |
| Pigment dispersion C | | | | | | | | | | | | | | |
| Pigment dispersion D | | | | | | | | | | | | | | |
| Resin A | | | | | | | | | | | | | | |
| Resin B | | 15.0 | 15.0 | 15.0 | 15.0 | 15.0 | 15.0 | 15.0 | 15.0 | 15.0 | 15.0 | 15.0 | 15.0 | 15.0 |
| Resin C | | | | | | | | | | | | | | |
| Resin D | | | | | | | | | | | | | | |
| Resin E | | | | | | | | | | | | | | |
| Resin F | | | | | | | | | | | | | | |
| Surfactant represented by the formula (1) | Compound 1 | | | | | | | | | | | | | |
| | Compound 2 | | | | | | | | | | | | | |
| | Compound 3 | | | | | | | | | | | | | |
| | Compound 4 | | | | | | | | | | | | | |
| | Compound 5 | | | | | | | | | | | | | |
| | Compound 6 | | | | | | | | | | | | | |
| | Compound 7 | | | | | | | | | | | | | |
| | Compound 8 | | | | | | | | | | | | | |
| | Compound 9 | | | | | | | | | | | | | |
| | Compound 10 | | | | | | | | | | | | | |
| | Compound 11 | | | | | | | | | | | | | |
| | Compound 12 | | | | | | | | | | | | | |
| | Compound 13 | | | | | | | | | | | | | |
| | Compound 14 | 1.0 | | | | | | | | | | | | |
| | Compound 15 | | 1.0 | | | | | | | | | | | |

TABLE 3-2-continued

| | | \multicolumn{13}{c}{Composition and Properties of ink} |
|---|---|---|---|---|---|---|---|---|---|---|---|---|---|
| | | \multicolumn{13}{c}{Example} |
| | | 14 | 15 | 16 | 17 | 18 | 19 | 20 | 21 | 22 | 23 | 24 | 25 | 26 |
| | Compound 16 | | 1.0 | | | 0.2 | | | 2.0 | | | 0.1 | |
| | Compound 17 | | | 1.0 | | | 0.2 | | | 2.0 | | | | 0.1 |
| | Compound 18 | | | | 1.0 | | | 0.2 | | | 2.0 | | | |
| | Compound 19 | | | | | | | | | | | | | |
| | Compound 20 | | | | | | | | | | | | | |
| | Compound 21 | | | | | | | | | | | | | |
| | Compound 22 | | | | | | | | | | | | | |
| | Compound 23 | | | | | | | | | | | | | |
| | Compound 24 | | | | | | | | | | | | | |
| | Compound 25 | | | | | | | | | | | | | |
| Glycerol | | 15.0 | 15.0 | 15.0 | 15.0 | 15.0 | 15.0 | 15.0 | 15.0 | 15.0 | 15.0 | 15.0 | 15.0 | 15.0 |
| 2-Pyrrolidone | | 5.0 | 5.0 | 5.0 | 5.0 | 5.0 | 5.0 | 5.0 | 5.0 | 5.0 | 5.0 | 5.0 | 5.0 | 5.0 |
| ACETYLENOL E100 | | 0.8 | 0.8 | 0.8 | 0.8 | 0.8 | 0.8 | 0.8 | 0.8 | 0.8 | 0.8 | 0.8 | 0.8 | 0.8 |
| Water | | 43.2 | 43.2 | 43.2 | 43.2 | 43.2 | 44.0 | 44.0 | 44.0 | 42.2 | 42.2 | 42.2 | 44.1 | 44.1 |
| Content A of pigment [%] | | 4.0 | 4.0 | 4.0 | 4.0 | 4.0 | 4.0 | 4.0 | 4.0 | 4.0 | 4.0 | 4.0 | 4.0 | 4.0 |
| Content B of resin [%] | | 1.5 | 1.5 | 1.5 | 1.5 | 1.5 | 1.5 | 1.5 | 1.5 | 1.5 | 1.5 | 1.5 | 1.5 | 1.5 |
| Content C of surfactant represented by the formula (1) [%] | | 1.0 | 1.0 | 1.0 | 1.0 | 1.0 | 0.2 | 0.2 | 0.2 | 2.0 | 2.0 | 2.0 | 0.1 | 0.1 |
| Value B/A [times] | | 0.38 | 0.38 | 0.38 | 0.38 | 0.38 | 0.38 | 0.38 | 0.38 | 0.38 | 0.38 | 0.38 | 0.38 | 0.38 |
| Value C/A [times] | | 0.25 | 0.25 | 0.25 | 0.25 | 0.25 | 0.05 | 0.05 | 0.05 | 0.50 | 0.50 | 0.50 | 0.03 | 0.03 |

TABLE 3-3

| | | \multicolumn{13}{c}{Composition and Properties of ink} |
|---|---|---|---|---|---|---|---|---|---|---|---|---|---|
| | | \multicolumn{13}{c}{Example} |
| | | 27 | 28 | 29 | 30 | 31 | 32 | 33 | 34 | 35 | 36 | 37 | 38 | 39 |
| Pigment dispersion A | | 20.0 | 20.0 | 20.0 | 20.0 | 20.0 | 20.0 | 20.0 | 20.0 | 20.0 | 20.0 | 20.0 | 20.0 | 20.0 |
| Pigment dispersion B | | | | | | | | | | | | | | |
| Pigment dispersion C | | | | | | | | | | | | | | |
| Pigment dispersion D | | | | | | | | | | | | | | |
| Resin A | | | | | | | | | | | | | | 15.0 |
| Resin B | | 15.0 | 15.0 | 15.0 | 15.0 | 15.0 | 15.0 | 15.0 | 15.0 | 15.0 | 15.0 | 15.0 | 15.0 | |
| Resin C | | | | | | | | | | | | | | |
| Resin D | | | | | | | | | | | | | | |
| Resin E | | | | | | | | | | | | | | |
| Resin F | | | | | | | | | | | | | | |
| Surfactant represented by the formula (1) | Compound 1 | | | | | | | | | | | | | |
| | Compound 2 | | | | | | | | | | | | | |
| | Compound 3 | | | | | | | | | | | | | |
| | Compound 4 | | | | | | | | | | | | | |
| | Compound 5 | | | | | | | | | | | | | |
| | Compound 6 | | | | | | | | | | | | | |
| | Compound 7 | | | | | | | | | | | | | |
| | Compound 8 | | | | | | | | | | | | | |
| | Compound 9 | | | | | | | | | | | | | |
| | Compound 10 | | | | | | | | | | | | | |
| | Compound 11 | | | | | | | | | | | | | |
| | Compound 12 | | | | | | | | | | | | | |
| | Compound 13 | | | | | | | | | | | | | |
| | Compound 14 | | | | | | | | | | | | | |
| | Compound 15 | | | | | | | | | | | | | |
| | Compound 16 | | 2.1 | | | | | | | | | | | |
| | Compound 17 | | | 2.1 | | | | | | | | | | |
| | Compound 18 | 0.1 | | | 2.1 | | | | | | | | | |
| | Compound 19 | | | | | 0.1 | 2.1 | | | | | | | |
| | Compound 20 | | | | | | | 0.1 | 2.1 | | | | | |
| | Compound 21 | | | | | | | | | 0.1 | 2.1 | | | |
| | Compound 22 | | | | | | | | | | | 0.1 | 2.1 | 2.1 |
| | Compound 23 | | | | | | | | | | | | | |
| | Compound 24 | | | | | | | | | | | | | |
| | Compound 25 | | | | | | | | | | | | | |
| Glycerol | | 15.0 | 15.0 | 15.0 | 15.0 | 15.0 | 15.0 | 15.0 | 15.0 | 15.0 | 15.0 | 15.0 | 15.0 | 15.0 |
| 2-Pyrrolidone | | 5.0 | 5.0 | 5.0 | 5.0 | 5.0 | 5.0 | 5.0 | 5.0 | 5.0 | 5.0 | 5.0 | 5.0 | 5.0 |
| ACETYLENOL E100 | | 0.8 | 0.8 | 0.8 | 0.8 | 0.8 | 0.8 | 0.8 | 0.8 | 0.8 | 0.8 | 0.8 | 0.8 | 0.8 |
| Water | | 44.1 | 42.1 | 42.1 | 42.1 | 44.1 | 42.1 | 44.1 | 42.1 | 44.1 | 42.1 | 44.1 | 42.1 | 42.1 |
| Content A of pigment [%] | | 4.0 | 4.0 | 4.0 | 4.0 | 4.0 | 4.0 | 4.0 | 4.0 | 4.0 | 4.0 | 4.0 | 4.0 | 4.0 |

TABLE 3-3-continued

Composition and Properties of ink

| | Example | | | | | | | | | | | | |
|---|---|---|---|---|---|---|---|---|---|---|---|---|---|
| | 27 | 28 | 29 | 30 | 31 | 32 | 33 | 34 | 35 | 36 | 37 | 38 | 39 |
| Content B of resin [%] | 1.5 | 1.5 | 1.5 | 1.5 | 1.5 | 1.5 | 1.5 | 1.5 | 1.5 | 1.5 | 1.5 | 1.5 | 1.5 |
| Content C of surfactant represented by the formula (1) [%] | 0.1 | 2.1 | 2.1 | 2.1 | 0.1 | 2.1 | 0.1 | 2.1 | 0.1 | 2.1 | 0.1 | 2.1 | 2.1 |
| Value B/A [times] | 0.38 | 0.38 | 0.38 | 0.38 | 0.38 | 0.38 | 0.38 | 0.38 | 0.38 | 0.38 | 0.38 | 0.38 | 0.38 |
| Value C/A [times] | 0.03 | 0.53 | 0.53 | 0.53 | 0.03 | 0.53 | 0.03 | 0.53 | 0.03 | 0.53 | 0.03 | 0.53 | 0.53 |

TABLE 3-4

Composition and Properties of ink

| | | Example | | | | | | | | | |
|---|---|---|---|---|---|---|---|---|---|---|---|
| | | 40 | 41 | 42 | 43 | 44 | 45 | 46 | 47 | 48 | 49 |
| Pigment dispersion A | | 20.0 | 20.0 | 20.0 | 20.0 | 20.0 | 20.0 | 20.0 | 20.0 | | |
| Pigment dispersion B | | | | | | | | | | 20.0 | |
| Pigment dispersion C | | | | | | | | | | | 20.0 |
| Pigment dispersion D | | | | | | | | | | | |
| Resin A | | | | | | | | | | | |
| Resin B | | | | | | | | | | 1.5 | 1.5 |
| Resin C | | 15.0 | | | | | | | | | |
| Resin D | | | 15.0 | 10.0 | 40.0 | 9.0 | 41.0 | | 4.1 | | |
| Resin E | | | | | | | | 4.1 | | | |
| Resin F | | | | | | | | | | | |
| Surfactant represented by the formula (1) | Compound 1 | | | | | | | | | | |
| | Compound 2 | | | | | | | | | 1.0 | 1.0 |
| | Compound 3 | | | | | | | | | | |
| | Compound 4 | | | | | | | | | | |
| | Compound 5 | | | | | | | | | | |
| | Compound 6 | | | | | | | | | | |
| | Compound 7 | | | | | | | | | | |
| | Compound 8 | | | | | | | | | | |
| | Compound 9 | | | | | | | | | | |
| | Compound 10 | | | | | | | | | | |
| | Compound 11 | | | | | | | | | | |
| | Compound 12 | | | | | | | | | | |
| | Compound 13 | | | | | | | | | | |
| | Compound 14 | | | | | | | | | | |
| | Compound 15 | | | | | | | | | | |
| | Compound 16 | | | | | | | | | | |
| | Compound 17 | | | | | | | | | | |
| | Compound 18 | | | | | | | | | | |
| | Compound 19 | | | | | | | | | | |
| | Compound 20 | | | | | | | | | | |
| | Compound 21 | | | | | | | | | | |
| | Compound 22 | 2.1 | 2.1 | 2.1 | 2.1 | 2.1 | 2.1 | 2.1 | | | |
| | Compound 23 | | | | | | | | 2.1 | | |
| | Compound 24 | | | | | | | | | | |
| | Compound 25 | | | | | | | | | | |
| Glycerol | | 15.0 | 15.0 | 15.0 | 15.0 | 15.0 | 15.0 | 15.0 | 15.0 | 15.0 | 15.0 |
| 2-Pyrrolidone | | 5.0 | 5.0 | 5.0 | 5.0 | 5.0 | 5.0 | 5.0 | 5.0 | 5.0 | 5.0 |
| ACETYLENOL E100 | | 0.8 | 0.8 | 0.8 | 0.8 | 0.8 | 0.8 | 0.8 | 0.8 | 0.8 | 0.8 |
| Water | | 42.1 | 42.1 | 47.1 | 17.1 | 48.1 | 16.1 | 53.0 | 53.0 | 56.7 | 56.7 |
| Content A of pigment [%] | | 4.0 | 4.0 | 4.0 | 4.0 | 4.0 | 4.0 | 4.0 | 4.0 | 4.0 | 4.0 |
| Content B of resin [%] | | 1.5 | 1.5 | 1.0 | 4.0 | 0.9 | 4.1 | 0.4 | 0.4 | 0.2 | 0.2 |
| Content C of surfactant represented by the formula (1) [%] | | 2.1 | 2.1 | 2.1 | 2.1 | 2.1 | 2.1 | 2.1 | 2.1 | 1.0 | 1.0 |
| Value B/A [times] | | 0.38 | 0.38 | 0.25 | 1.00 | 0.23 | 1.03 | 0.10 | 0.10 | 0.04 | 0.04 |
| Value C/A [times] | | 0.53 | 0.53 | 0.53 | 0.53 | 0.53 | 0.53 | 0.53 | 0.53 | 0.25 | 0.25 |

TABLE 3-5

| | | Comparative Example | | | | | | Ref. Ex. |
| --- | --- | --- | --- | --- | --- | --- | --- | --- |
| | | 1 | 2 | 3 | 4 | 5 | 6 | 1 |
| Pigment dispersion A | | 20.0 | 20.0 | 20.0 | 20.0 | 20.0 | 20.0 | |
| Pigment dispersion B | | | | | | | | |
| Pigment dispersion C | | | | | | | | |
| Pigment dispersion D | | | | | | | | 20.0 |
| Resin A | | | | | | 1.5 | | |
| Resin B | | | | | | | | |
| Resin C | | | | | | | | |
| Resin D | | | 4.1 | 4.1 | | | | |
| Resin E | | | | | | | | |
| Resin F | | 4.1 | | | | | | |
| Surfactant represented by the formula (1) | Compound 1 | | | | | | | |
| | Compound 2 | | | | 1.0 | | | |
| | Compound 3 | | | | | | | |
| | Compound 4 | | | | | | | |
| | Compound 5 | | | | | | | |
| | Compound 6 | | | | | | | |
| | Compound 7 | | | | | | | |
| | Compound 8 | | | | | | | |
| | Compound 9 | | | | | | | |
| | Compound 10 | | | | | | | |
| | Compound 11 | | | | | | | |
| | Compound 12 | | | | | | | |
| | Compound 13 | | | | | | | |
| | Compound 14 | | | | | | | |
| | Compound 15 | | | | | | | |
| | Compound 16 | | | | | | 1.0 | 1.0 |
| | Compound 17 | | | | | | | |
| | Compound 18 | | | | | | | |
| | Compound 19 | | | | | | | |
| | Compound 20 | | | | | | | |
| | Compound 21 | | | | | | | |
| | Compound 22 | | | | | | | |
| | Compound 23 | 2.1 | | | | | | |
| | Compound 24 | | 2.1 | | | | | |
| | Compound 25 | | | 2.1 | | | | |
| Glycerol | | 15.0 | 15.0 | 15.0 | 15.0 | 15.0 | 15.0 | 15.0 |
| 2-Pyrrolidone | | 5.0 | 5.0 | 5.0 | 5.0 | 5.0 | 5.0 | 5.0 |
| ACETYLENOL E100 | | 0.8 | 0.8 | 0.8 | 0.8 | 0.8 | 0.8 | 0.8 |
| Water | | 53.0 | 53.0 | 53.0 | 58.2 | 57.7 | 58.2 | 58.2 |
| Content A of pigment [%] | | 4.0 | 4.0 | 4.0 | 4.0 | 4.0 | 4.0 | — |
| Content B of resin [%] | | 0.4 | 0.4 | 0.4 | 0.0 | 0.2 | 0.0 | — |
| Content C of surfactant represented by the formula (1) [%] | | 2.1 | 2.1 | 2.1 | 1.0 | 0.0 | 1.0 | 1.0 |
| Value B/A [times] | | 0.10 | 0.10 | 0.10 | 0.00 | 0.04 | 0.00 | — |
| Value C/A [times] | | 0.53 | 0.53 | 0.53 | 0.25 | 0.00 | 0.25 | — |

Evaluation:

An ink cartridge charged with each of the inks obtained above was installed in an ink jet recording apparatus (trade name "PIXUS Pro9500", manufactured by Canon Inc.) equipped with a recording head for ejecting an ink by the action of thermal energy. The resolution of this recording head is 600 dpi×600 dpi, a layer composed of tantalum and tantalum oxide is formed as a protecting layer of a heating resistor at a heater portion, and the surface of this protecting layer becomes a liquid contact surface to be in contact with an ink. This ink jet recording apparatus was used to record a solid image used in each evaluation under conditions that six ink droplets each of which is 3.5 pL are applied to a unit region of 1/600 inch×1/600 inch. At that time, a printer driver was set as follows: kind of paper: plain paper; print quality: standard; and color adjustment: automatic. As a recording medium, was used plain paper (trade name "PB PAPER GF-500", products of Canon Inc.).

Evaluation of Ejection Stability

A solid image of 19 cm×26 cm was recorded on 1,000 A4-sized recording media under the above-described conditions. Thereafter, the recording head was taken out of the ink jet recording apparatus to observe the interior of an ink flow path through a light microscope. When a deposit did not occur at this point of time, the solid image was further recorded on 500 recording media under the same conditions as described above to observe the interior of the ink flow path through the light microscope. This process was repeated until the solid image was recorded on 4,000 recording media on the maximum. Incidentally, when the deposit was observed to occur throughout the interior of the ink flow path, the evaluation was stopped at that point of time. Evaluation results of ejection stability are shown in Tables 4-1 and 4-2. The evaluation criteria of the ejection stability is shown below. In the present invention, "A" and "B" in the following evaluation criteria were regarded as an allowable level, and "C" was regarded as an unallowable level.

A: A deposit scarcely occurred at the point of time the recording was conducted on the predetermined number of the recording media;

B: A deposit slightly occurred at the point of time the recording was conducted on the predetermined number of the recording media;

C: A deposit occurred throughout the interior of the ink flow path at the point of time the recording was conducted on the predetermined number of the recording media.

Evaluation of Heater Durability.

A solid image was recorded on 4,000 4A-sized recording media under the same conditions as in the evaluation of the ejection stability. The solid image recorded on the 4,000-th recording medium was visually observed to evaluate heater durability. Evaluation results of the heater durability are shown in Tables 4-1 and 4-2. The evaluation criteria of the heater durability is shown below. In the present invention, "A" in the following evaluation criteria was regarded as an allowable level, and "B" was regarded as an unallowable level.

A: Blur did not occur in the solid image;
B: Blur and ejection failure due to breaking of wire occurred in the solid image.

TABLE 4-1

|  |  | Evaluation results | | | | | | | |
|---|---|---|---|---|---|---|---|---|---|
|  |  | Ejection stability | | | | | | | |
|  |  | 1,000 sheets | 1,500 sheets | 2,000 sheets | 2,500 sheets | 3,000 sheets | 3,500 sheets | 4,000 sheets | Heater durability |
| Example | 1 | A | A | A | A | A | A | A | A |
|  | 2 | A | A | A | A | A | A | A | A |
|  | 3 | A | A | A | A | A | A | A | A |
|  | 4 | A | A | A | A | A | A | A | A |
|  | 5 | A | A | A | A | A | A | A | A |
|  | 6 | A | A | A | A | A | A | A | A |
|  | 7 | A | A | A | A | A | A | A | A |
|  | 8 | A | A | A | A | A | A | A | A |
|  | 9 | A | A | A | A | A | A | A | A |
|  | 10 | A | A | A | A | A | A | B | A |
|  | 11 | A | A | A | A | A | A | B | A |
|  | 12 | A | A | A | A | A | A | B | A |
|  | 13 | A | A | A | A | A | A | B | A |
|  | 14 | A | A | A | A | A | A | B | A |
|  | 15 | A | A | A | A | A | A | B | A |
|  | 16 | A | A | A | A | A | B | B | A |
|  | 17 | A | A | A | A | A | B | B | A |
|  | 18 | A | A | A | A | A | B | B | A |
|  | 19 | A | A | A | A | A | B | B | A |
|  | 20 | A | A | A | A | A | B | B | A |
|  | 21 | A | A | A | A | A | B | B | A |
|  | 22 | A | A | A | A | A | B | B | A |
|  | 23 | A | A | A | A | A | B | B | A |
|  | 24 | A | A | A | A | A | B | B | A |
|  | 25 | A | A | A | A | B | B | B | A |
|  | 26 | A | A | A | A | B | B | B | A |
|  | 27 | A | A | A | A | B | B | B | A |
|  | 28 | A | A | A | A | B | B | B | A |
|  | 29 | A | A | A | A | B | B | B | A |
|  | 30 | A | A | A | A | B | B | B | A |
|  | 31 | A | A | A | A | B | B | B | A |
|  | 32 | A | A | A | A | B | B | B | A |
|  | 33 | A | A | A | A | B | B | B | A |
|  | 34 | A | A | A | A | B | B | B | A |
|  | 35 | A | A | A | B | B | B | B | A |
|  | 36 | A | A | A | B | B | B | B | A |
|  | 37 | A | A | A | B | B | B | B | A |
|  | 38 | A | A | A | B | B | B | B | A |
|  | 39 | A | A | A | B | B | B | B | A |
|  | 40 | A | A | A | B | B | B | B | A |
|  | 41 | A | A | B | B | B | B | B | A |
|  | 42 | A | A | B | B | B | B | B | A |
|  | 43 | A | A | B | B | B | B | B | A |
|  | 44 | A | B | B | B | B | B | B | A |
|  | 45 | A | B | B | B | B | B | B | A |
|  | 46 | A | B | B | B | B | B | B | A |
|  | 47 | A | B | B | B | B | B | B | A |
|  | 48 | A | A | A | A | A | A | A | A |
|  | 49 | A | A | A | A | A | A | A | A |

TABLE 4-2

| | | \multicolumn{7}{c}{Evaluation results} | |
| | | \multicolumn{7}{c}{Ejection stability} | |
| | | 1,000 sheets | 1,500 sheets | 2,000 sheets | 2,500 sheets | 3,000 sheets | 3,500 sheets | 4,000 sheets | Heater durability |
|---|---|---|---|---|---|---|---|---|---|
| Comp. Ex. | 1 | C | — | — | — | — | — | — | A |
| | 2 | C | — | — | — | — | — | — | A |
| | 3 | C | — | — | — | — | — | — | A |
| | 4 | C | — | — | — | — | — | — | B |
| | 5 | C | — | — | — | — | — | — | A |
| | 6 | C | — | — | — | — | — | — | B |
| Ref. Ex. | 1 | C | — | — | — | — | — | — | A |

The ink of Reference Example 1 is an ink containing a monoazo pigment to the particle surface of which a resin is bonded. This monoazo pigment is such that the interaction between the monoazo pigment and the surfactant is hard to develop, and so the action of stabilizing the precipitate of the monoazo pigment does not occur. Thus, the precipitate occurred throughout the interior of the ink flow path at the point of time the recording was conducted on 1,000 recording media.

The inks of Examples 2, 48 and 49 different only in that the kind of the hydrophilic group of the monoazo pigment is different. The inks of these Examples had performance of the same rank in ejection stability and heater durability. However, when the long-term storage stability of the inks was confirmed, the ink of Example 2 was relatively superior to those of Examples 48 and 49.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-164371, filed Jul. 27, 2011, which is hereby incorporated by reference herein in its entirety.

What is claimed is:

1. An ink for use in an ink jet recording system in which ink is ejected from a recording head by an action of thermal energy, the ink comprising a monoazo pigment, a resin, and a surfactant represented by the following formula (1):

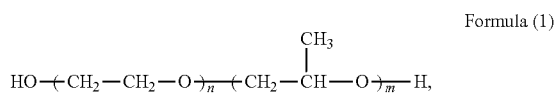

Formula (1)

wherein n is 1.0 or more, and m is 1.0 or more,
a proportion of a molecular weight of an ethylene oxide group moiety occupying the surfactant is 10% or more and 85% or less,
the monoazo pigment is a self-dispersible pigment to a particle surface of which at least one hydrophilic group selected from the group consisting of —COOM, —SO$_3$M, —PO$_3$HM, and —PO$_3$M$_2$ (M in the formula is a hydrogen atom, alkali metal, ammonium or organic ammonium) is bonded directly or through another atomic group, and a kind of the monoazo pigment is C.I. Pigment Yellow 74, and
an acid value of the resin is 240 mg KOH/g or less.

2. The ink according to claim 1, wherein the monoazo pigment is a self-dispersible pigment to the particle surface of which at least one hydrophilic group selected from the group consisting of —COOM, —SO$_3$M, —PO$_3$HM, and —PO$_3$M$_2$ (M in the formula is a hydrogen atom, alkali metal, ammonium or organic ammonium) is bonded through at least one other atomic group selected from the group consisting of an alkylene group, an arylene group, an amide group, a sulfonyl group, an amino group, a carbonyl group, an ester group, and an ether group.

3. The ink according to claim 1, wherein a content (% by mass) of the resin in the ink is 0.25 times or more and 1.0 times or less in terms of mass ratio as much as the content (% by mass) of the monoazo pigment.

4. The ink according to claim 1, wherein the acid value of the resin is 170 mg KOH/g or less.

5. The ink according to claim 1, wherein m in the formula (1) is 10.0 or more and 60.0 or less.

6. The ink according to claim 1, wherein a content (% by mass) of the surfactant in the ink is 0.05 times or more and 0.5 times or less in terms of mass ratio as much as the content (% by mass) of the monoazo pigment.

7. The ink according to claim 1, wherein the proportion of the molecular weight of the ethylene oxide group moiety occupying the surfactant is 41% or more and 85% or less.

8. The ink according to claim 1, wherein the proportion of a molecular weight of an ethylene oxide group moiety occupying the surfactant is 57% or more and 85% or less.

9. An ink cartridge comprising an ink and an ink storage portion storing the ink, wherein the ink is the ink according to claim 1.

10. An ink jet recording method comprising ejecting an ink from a recording head of an ink jet system by an action of thermal energy to record an image on a recording medium, wherein the ink is the ink according to claim 1.

11. The ink according to claim 1, wherein the acid value of the resin is 100 mg KOH/g or more.

12. The ink according to claim 1, wherein the content (% by mass) of the resin in the ink is 1.0% by mass or more and 5.0% by mass or less.

13. The ink according to claim 1, wherein the content (% by mass) of the monoazo pigment in the ink is 2.5% by mass or more and 10.0% by mass or less.

14. The ink according to claim 1, wherein the content (% by mass) of the surfactant represented by the formula (1) is 0.05% by mass or more and 5.0% by mass or less.

15. The ink according to claim 1, wherein the surfactant represented by the formula (1) has a block of the ethylene oxide group moiety bonded to both ends of the propylene oxide group.

16. The ink according to claim 1, wherein the n in the surfactant represented by the formula (1) is 7.9 or more and 450.0 or less.

17. The ink according to claim 1, wherein the m in the surfactant represented by the formula (1) is 10.0 or more and 60.0 or less.

* * * * *